A. PUSTERLA.
AEROPLANE.
APPLICATION FILED JULY 9, 1909.

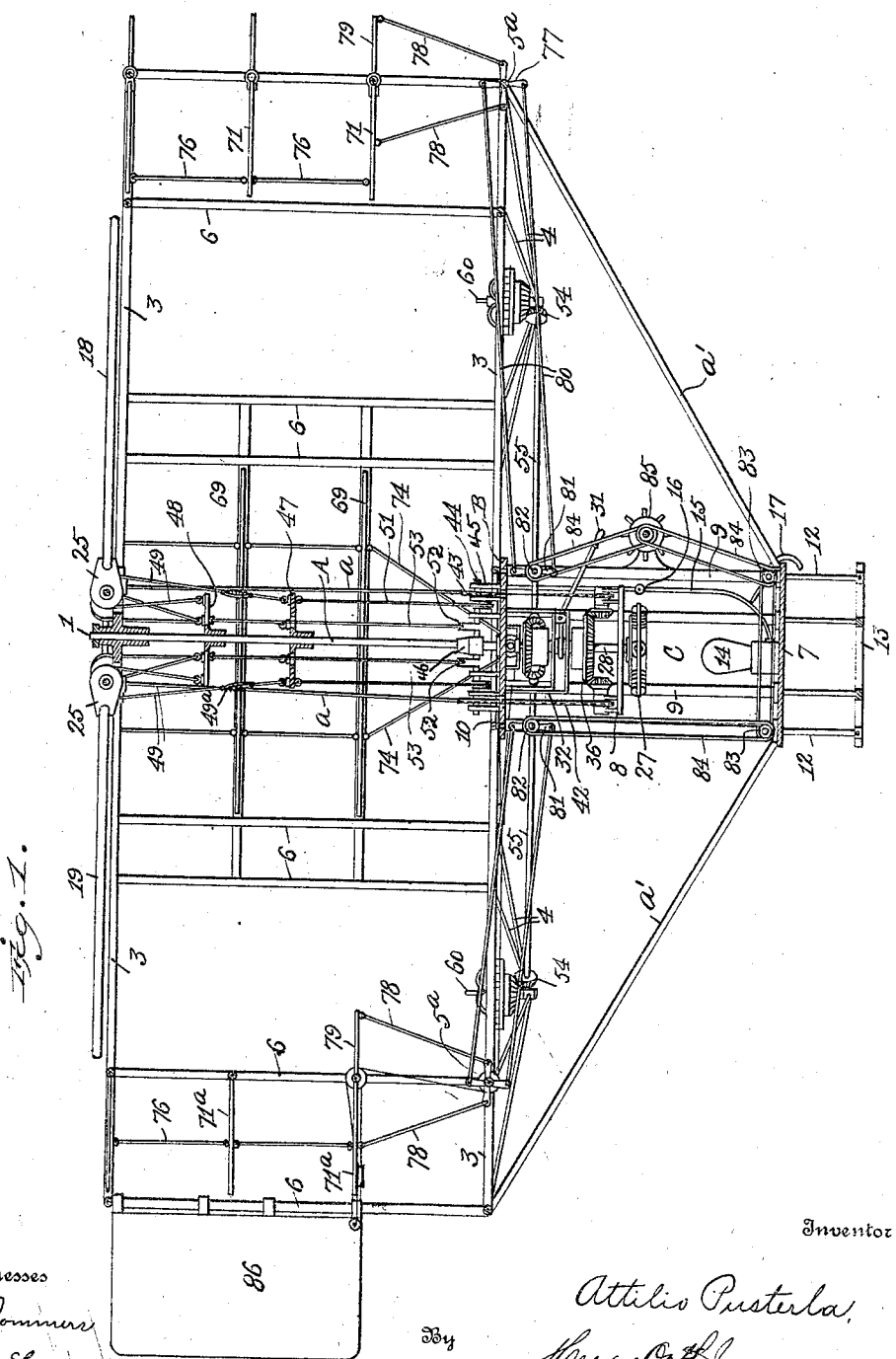

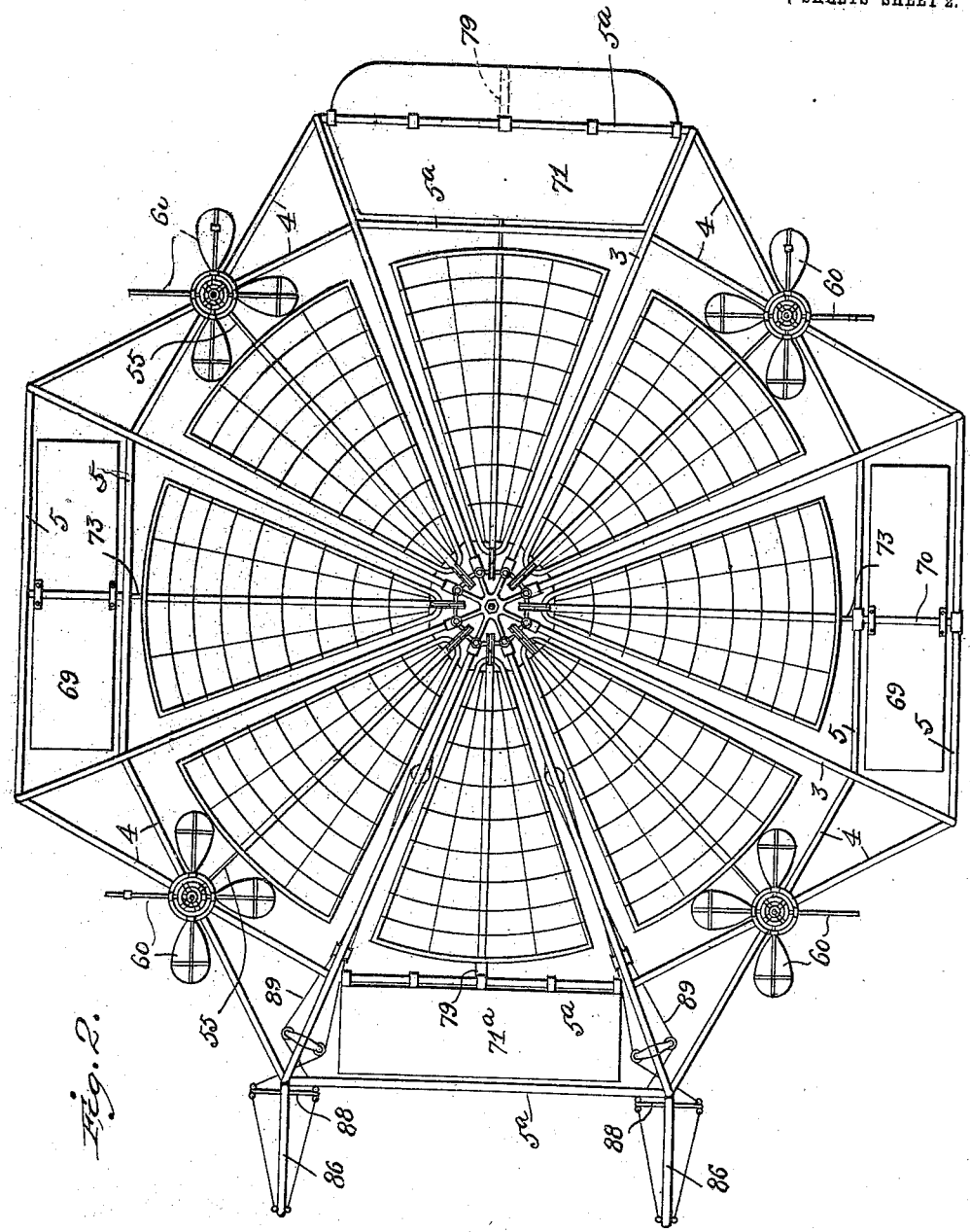

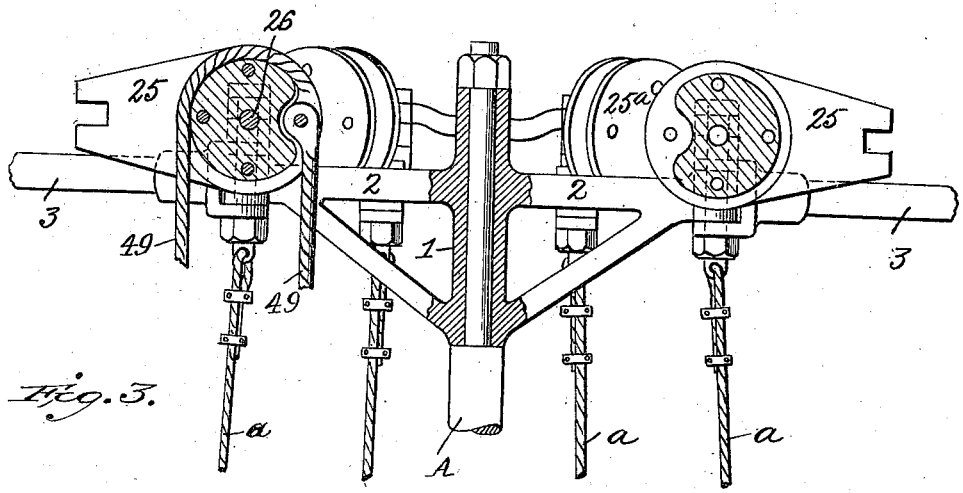
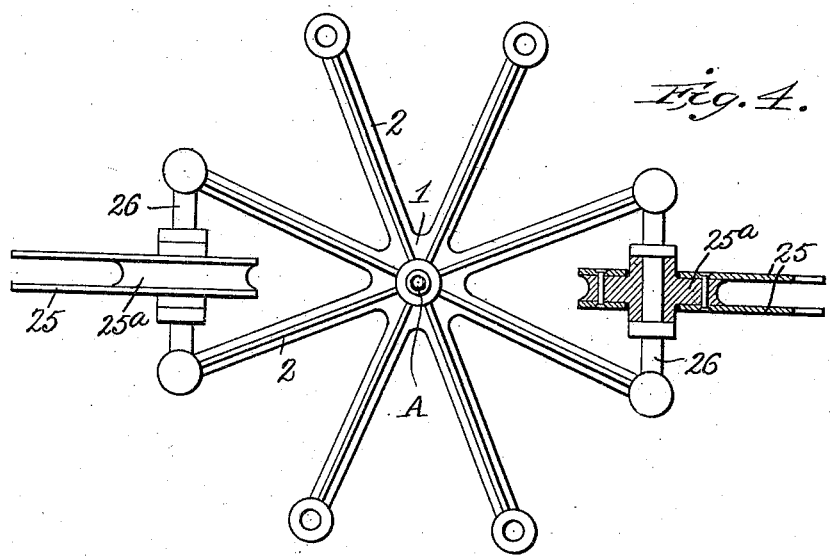

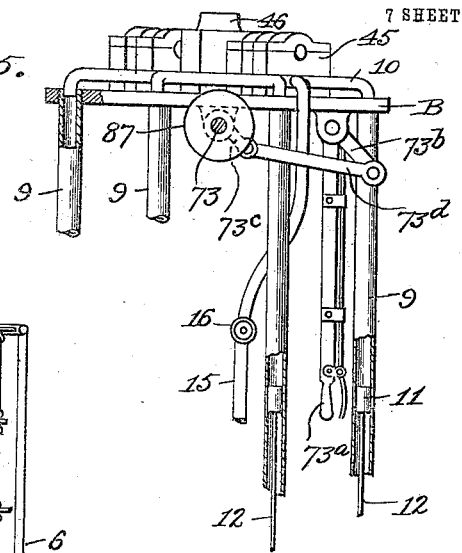
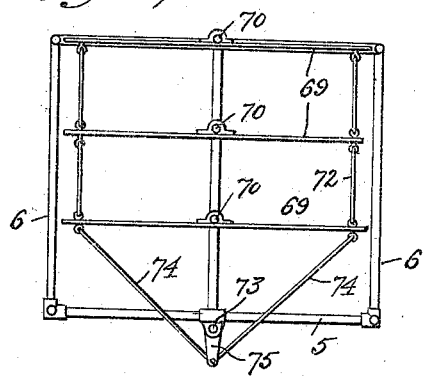
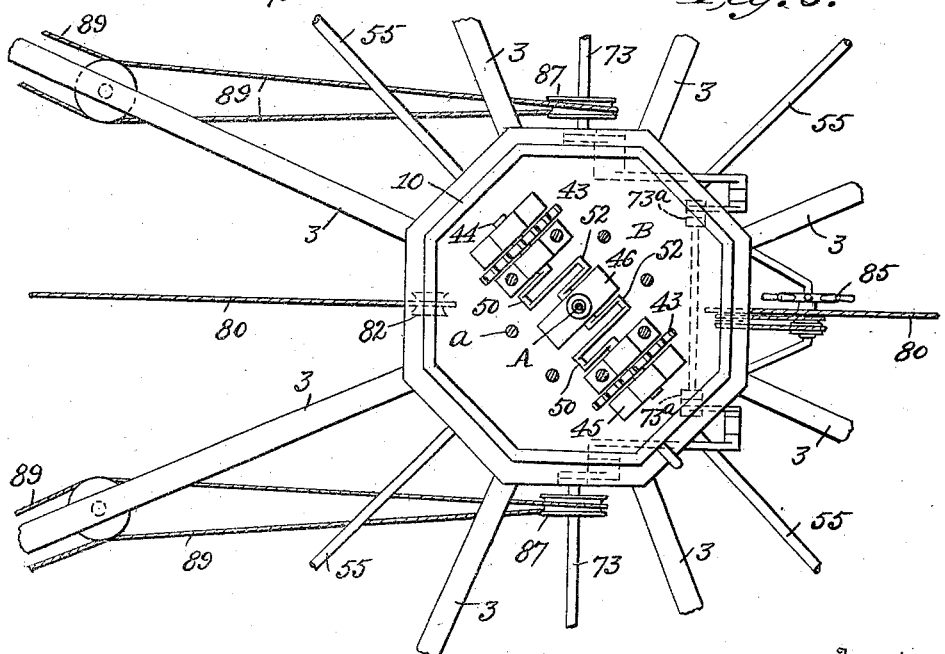

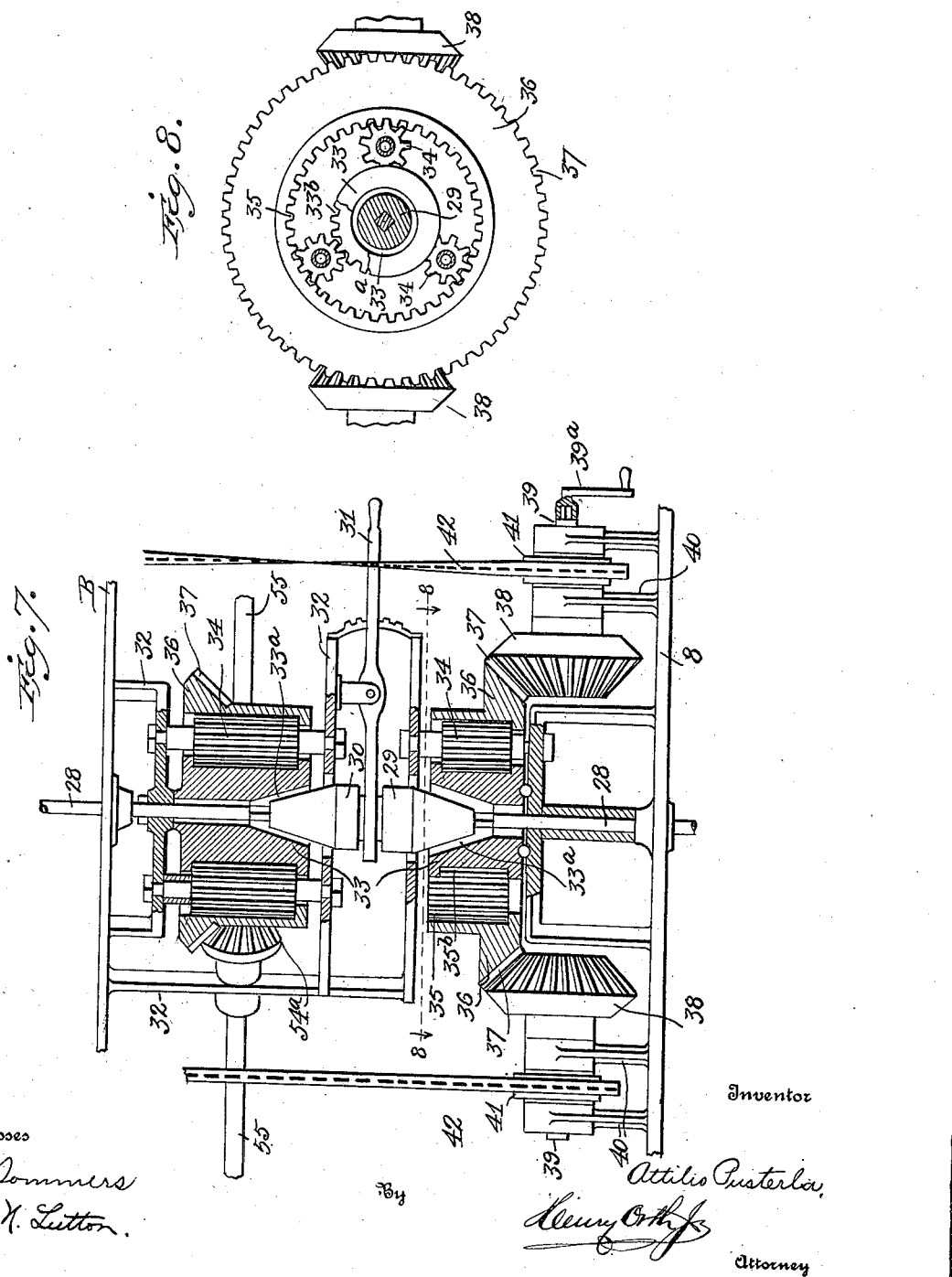

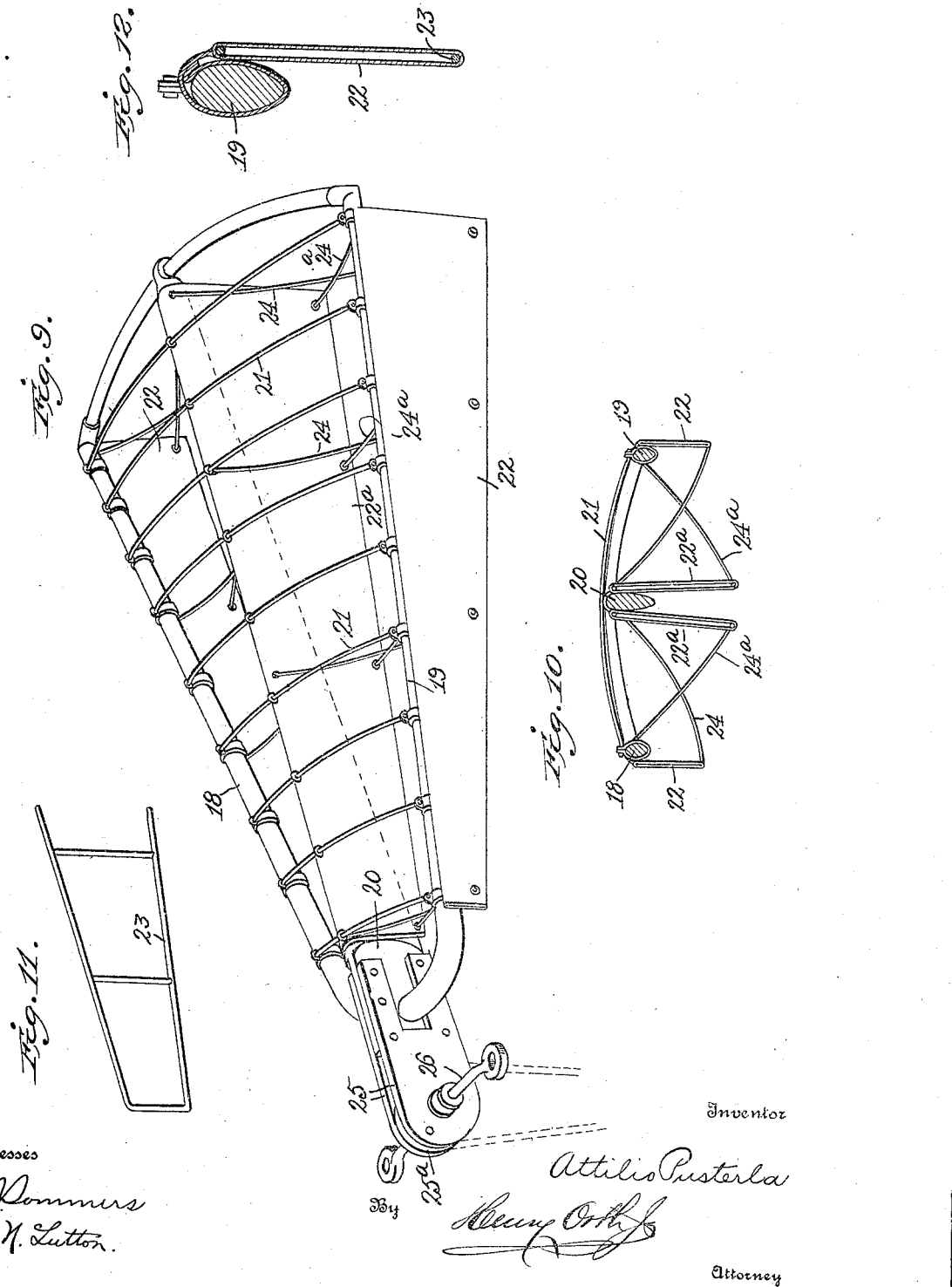

996,425.

Patented June 27, 1911.
7 SHEETS—SHEET 7.

Witnesses
B. Dommers
Jesse N. Lutton

Inventor
Attilio Pusterla
Henry Orth
Attorney

UNITED STATES PATENT OFFICE.

ATTILIO PUSTERLA, OF BATHBEACH, NEW YORK, ASSIGNOR OF ONE-HALF TO SAMUEL SCHENKEIN, OF NEW YORK, N. Y.

AEROPLANE.

996,425.  Specification of Letters Patent. Patented June 27, 1911.

Application filed July 9, 1909. Serial No. 506,813.

*To all whom it may concern:*

Be it known that I, ATTILIO PUSTERLA, a citizen of the United States, residing at Bathbeach, Long Island, New York, have invented certain new and useful Improvements in Aeroplanes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in aeroplanes, and has for its object to provide a safe and reliable machine capable of ascending in a vertical plane, of traveling in a horizontal plane, and of being guided laterally at the will of the operator.

To these ends the invention consists in providing an even number of radial wings, preferably more than two, so constructed and operated as to effect the vertical ascent; in providing lateral, horizontally pivoted steering planes coöperating with vertically pivoted rudder planes for effectively controlling the lateral movements; in providing forward and rear horizontally pivoted planes for controlling the upward and downward movement during flight, and in providing a plurality of propeller blades for driving the machine forward and backward.

The invention consists also in the construction, combination and arrangement of parts, as hereinafter more particularly set forth, and specified in the claims.

Figure 13:
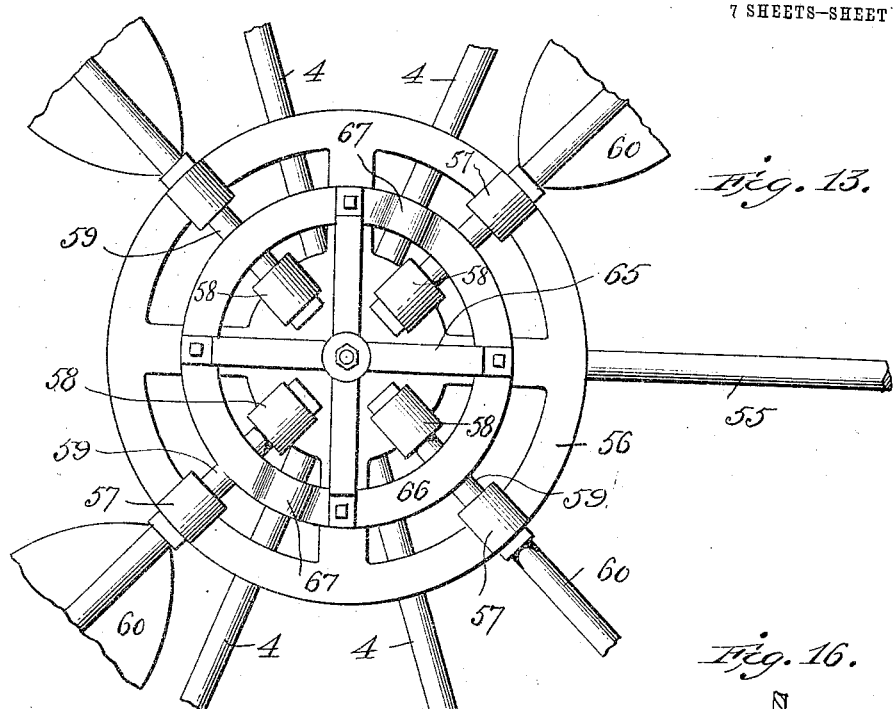
Figure 14:
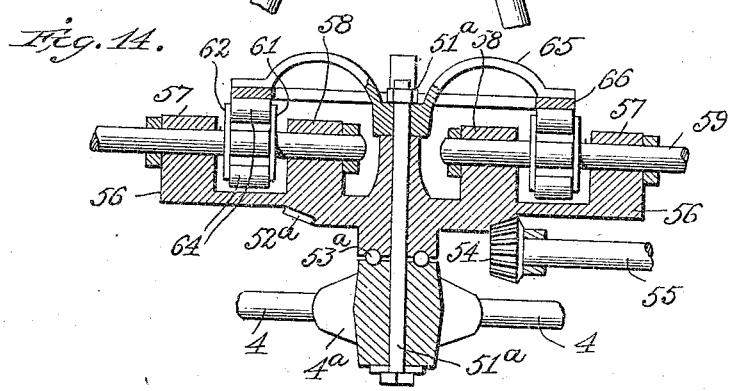
Figure 16:
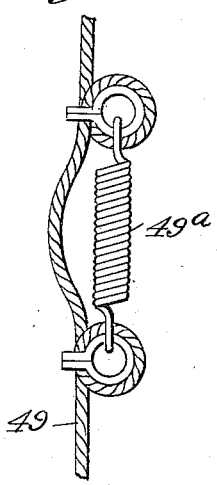
Figure 15:
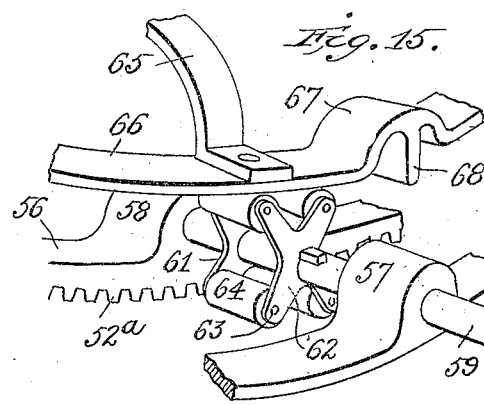

In the accompanying drawings—Figure 1 is a longitudinal, vertical section of a machine embodying my invention. Fig. 2 is a plan view of the machine. Fig. 3 is an enlarged, detail, vertical, sectional view of the top central portion of the frame and parts connected thereto. Fig. 4 is a top plan of the same. Fig. 5 is an enlarged detail side elevation of the lower central portion of the machine. Fig. 6 is a plan of the same portion, showing additional parts. Fig. 7 is an enlarged detail elevation, partly in section, of the clutch mechanism. Fig. 8 is a horizontal section on line 8—8 Fig. 7. Fig. 9 is an enlarged perspective view of one of the operating wings. Fig. 10 is a cross section of a wing. Fig. 11 is a perspective view of a valve frame. Fig. 12 is an enlarged cross section of one of the side rods and valve of the wings. Fig. 13 is a plan view of the propeller mechanism. Fig. 14 is a vertical section of the same. Fig. 15 is a detail view, in perspective, of a portion of the same mechanism. Fig. 16 is a detail view of one of the operating ropes and shock absorbing spring. Fig. 17 is a side view of a set of guiding planes.

The main frame consists of a central tubular column A, mounted at its base on an octagonal platform B, and has fixed at its upper end a spider 1 formed with an even number of radiating arms 2, preferably eight, as here shown, said spider and platform being connected by a series of guy-ropes a.

To the outer end of each arm of the spider 1, and at each angle of the platform B is secured a horizontal tube 3, which tubes are connected in pairs by horizontal cross-pieces 4, Fig. 2, and each pair is connected by horizontal parallel bars 5, 5, and 5ª, 5ª, while the upper and lower sets of tubes 3 are connected at and near their outer ends by vertical posts 6.

Beneath the platform B is secured a cage C, for the accommodation of one or more operators and for the reception of the engine and motor. This cage consists of a platform 7, and roof 8, preferably the same shape as the platform B and connected to the latter by hollow columns 9, and to the lower horizontal rods 3 by stay-rods *a'*. The columns communicate with each other through a series of connecting conduits 10, Fig. 5, and in each of said columns is mounted a piston 11, connected to a piston rod 12 projecting out of the column and connected to a bumper frame 13, of suitable construction.

An air pump, as 14, operated by any suitable means, is mounted on the platform 7 and is connected to the conduits 10 by a pipe 15 provided with a suitable valve 16, controlled by the operator.

The purpose of the piston rods is first to aid in starting the machine to ascend, and, second, to act as a cushion in descending.

The starting is accomplished by first bringing the platform 7 and the supporting or bumper frame 13 into close relation by exhausting the air in the cylinders and locking the frame and platform together by means of a suitable trigger mechanism, as 17, mounted on the platform 7 and operable by the foot of the operator. Air is then compressed in the columns 9 by means of the pump, through the conduits 15 and 10, so that when the trigger is released the air is allowed to suddenly expand, projecting the rods 12 and raising the platform 7 together with the main frame. When the machine descends the piston rods will first come in contact with the ground, and the air in the columns will be compressed by the inward movement of the pistons, thereby acting as an air cushion.

After the frame has been given a start by the means above described, the ascent is continued by a plurality of pivoted wings, which are constructed and operated in the following described manner: The wings, shown in detail in Figs. 9 to 12, extend into angular spaces formed between the upper radiating tubes 3, and comprise two side bars 18, 19, and a central bar 20, and to make the wings as light as possible, the side bars are constructed of strips of bamboo or other strong, light wood, shaped to conform to said angular spaces, and are connected throughout their length by cross rods or braces 21. To each of the side bars is connected a single valve 22, while to the center bar are connected two valves 22$^a$. The valves preferably consist of strips of canvas stretched on a frame 23 and connected to the bars in any manner to permit them to swing freely. To prevent the outer valves from swinging outward too far when moved downward, each outer valve is connected to the central bar 20 by a retaining cord 24 and to insure the separation of the inner valve when moved downward they are held slightly separated by cords 24$^a$ connected to the bars 18, 19 and to the lower end of the valves 22$^a$. On the inner ends of the central bars are fixed two plates 25, which have fixed between them a pulley 25$^a$, which is journaled on a short shaft 26 fixed to the arms of the spider 1, as shown in Figs. 3 and 4. Mounted beneath the roof 8 and secured thereto in any suitable manner is a motor 27, which may be any desired type of explosion motor operated by liquid fuel, preferably gasolene.

The main shaft 28, of the motor extends through the roof 8. Mounted on the shaft which is preferably square in cross section is a clutch sleeve consisting of two oppositely positioned conical surfaces 29 and 30, Fig. 7 and having a square bore to fit the shaft 28 so as to rotate therewith. The sleeve is movable longitudinally of the shaft by means of a lever 31 engaging the sleeve and pivotally mounted on a framing 32, depending from the platform B.

Surrounding each conical surface is a coöperating clutch member 33, provided with a recess 33$^a$ to receive one end of the sleeve and frictionally engage the same. Each hollow clutch member 33 has integral peripheral gear teeth 33$^b$ which mesh with a series of small gears 34, journaled in the framing and meshing with internal teeth 35 of a gear 36 which has external bevel teeth 37 in mesh with bevel pinions 38.

The lower bevel pinions 38 are fixed on shafts 39, journaled in suitable standards 40, and have fixed thereon sprocket wheels 41 which are connected by sprocket chains 42 with sprocket wheels 43, Fig. 1, which are fixed on a crank-shaft 44 journaled in bearings 45 Fig. 6, mounted on the platform B.

The center journal, or pillow block, 46, for the crank shaft forms a step for the central column A, on which are slidably mounted two sleeves 47 and 48. These sleeves are connected together, and to the pulleys fixed to the wings, by means of ropes or other flexible connecting members 49. The sleeve 47 is connected to cranks 50, 50, of the crank-shaft 44, by flexible connecting members 51, 51, and the sleeve 48 is connected to cranks 52, 52, by flexible members 53, 53, which pass through apertures in the sleeve 47.

The relative position of the cranks and the manner in which they are connected to the sleeves cause the latter to be raised and lowered simultaneously; or in other words, when the sleeve 47 through the medium of its connecting members 51 is pulled down the sleeve 48 through its connecting members 49 is raised and when the sleeve 48 is lowered by the downward movement of cranks 52 through the medium of connecting members 53, the sleeve 47 is raised by the connecting member 49.

To rotate each alternate pulley in the same direction, in order that this movement may be imparted to the wings, the flexible connecting members or ropes 49 are connected to the pulleys in the following manner: Each alternate rope 49 passes from the sleeve 47, where it is connected, over the outside of each alternate pulley and is connected to the periphery thereof, while the other ropes 49 pass over the inside of the other pulleys, and are likewise connected thereto, so that the simultaneous downward pull on the ropes 49 will rotate each alternate pulley in the same direction, or each adjacent pulley in opposite direction. To prevent slacking of the ropes, and to absorb the shocks incident to the changing of the direction of movement of the sleeves, I connect coiled springs 49$^a$ to said ropes in the manner shown in Fig. 16.

Horizontal movement is imparted to the machine by means of a series of propellers mounted around the outer edge of the main frame on the lower cross pieces 4. Each propeller mechanism comprises a stationary vertical post, 51$^a$, Fig. 14; fixed in a bracket 4ᵃ secured to the cross pieces 4 and journaled on said post is a bevel gear 52ᵃ resting on ball bearings 53ᵃ in the top of the bracket. This gear 52ᵃ meshes with a bevel pinion 54 on the outer end of a horizontal driven shaft 55, which carries at its inner end a bevel gear 54ᵃ, Fig. 7, which meshes with the upper bevel gear 36 adapted to be driven by the clutch surface 30, as hereinbefore described, when the latter is shifted by the lever 31 into contact with the upper clutch member 33. Formed integral with the bevel gear 52ᵃ is a circular plate 56 provided with radial bearings 57, in which bearings and in bearings 58 on the gear 52ᵃ are journaled shafts 59 carrying propeller blades 60. Keyed on the shafts 59 between the bearings 57, 58 are two parallel brackets 61, 62, Fig. 15, each having preferably four arms connected by pins 63, on which are journaled rollers 64.

Fixed on the squared end of the stationary post 51ᵃ is a spider 65, which supports a ring 66 in the path of revolution of the rollers 64. At each half of the ring 66 is formed an arch 67 of such height as to permit the rollers 64 to move through the arc of the circle, and depending from the center of said arch and below the under face of the ring 66 is a finger 68, which, as the rollers 64 are moved past said finger by the rotation of the plate 56, causes the shafts 59 to rotate a quarter of a turn and cause a simultaneous rotation of two oppositely positioned propeller blades a quarter of a revolution.

A series of superposed lateral planes 69 are mounted at each side of the frame and centrally pivoted between the parallel bars 5, 5; on cross bars 70 fixed to said bars 5, 5, and on the inner and outer parallel bars 5ᵃ at the front and rear of the frame, respectively, are pivoted at one edge a series of superposed planes 71. The planes 69 are pivotally connected to each other at their ends by rods 72, Fig. 17, so that they will move in unison; movement being imparted to the bottom plane of each series by means of shafts 73 journaled in the lower bars 5, 5, parallel to the cross bars 70 and extending to the cage C where each shaft is separately controlled by means of independent levers 73ᵃ, Fig. 5, which are connected with the shafts 73 by cranks 73ᵇ, 73ᶜ, fixed on the lever and shaft respectively, said cranks being connected by links 73ᵈ. The shafts 73 are operatively connected to the bottom planes by means of rods 74 which are pivotally connected to said planes at one end and to cranks 75 fixed on the shafts 73. The front and rear planes 71, 71ᵃ are pivotally connected in series by means of rods 76, Fig. 1, so that they will move in unison with the bottom planes, to which movement is imparted by the following mechanism.

On one of the lower rods 5ᵃ at both the front and rear of the frame is pivoted a four-armed lever 77, the two oppositely positioned arms of said levers being connected by means of ropes 78 with the lower planes and with levers 79 projecting from the latter, and the other two arms of the levers 77 are connected, by means of ropes 80, with two armed levers 81 fixed on sprocket wheels 82 journaled in the cage. The front and rear planes are simultaneously operated by connecting the two sprocket wheels 82 through intermediate sprocket wheels 83 and chains 84, which are controlled by a hand wheel 85 mounted on the cage.

The machine is guided in its horizontal movement by means of vertical rudders 86, pivotally mounted at each end of the rear planes 71ᵃ on the vertical tubes 6. These planes operate in conjunction with the planes 69 and are connected to the shafts 73 through the medium of pulleys 87 on the shaft 73, and cross arms 88 on the rudders, said pulleys and cross arms being connected by belts 89.

The operation of the machine is as follows: Simultaneously with the sudden lifting of the frame, by the action of the piston rods, as above described, the engine is started, and the outer end of the lever 31 is pushed up by the operator so as to lower the end 29 of the clutch sleeve, which is now rotating with the engine shaft 28, into frictional engagement with the lower clutch member 33, causing the latter to rotate and drive the crank-shaft 44 which operates the wings, as hereinbefore described, causing a vertical ascension of the machine. When the desired altitude is attained the movement of the wings is stopped by pulling down on the lever 31 sufficiently to raise the end 29 of the sleeve out of contact with the lower clutch member. The machine may now be driven forward by the propeller blades 60 which are connected with the upper clutch member 33, as hereinbefore described, by exerting a further pull on the lever 31 sufficient to raise the upper end 30 of the clutch sleeve into frictional engagement with the upper clutch member 33. During the forward flight the machine may be raised and lowered by means of the front and rear planes 71, 71ᵃ which are controlled and simultaneously operated by the mechanism hereinbefore described, said mechanism being controlled by the operator by means of the hand wheel 85. By rotating the wheel 85 in one direction the rear ends of the front and rear planes are simultaneously raised and lowered respectively, bringing the top of the front plane and the underside of the rear planes against the wind and causing the machine to descend, and by turning the wheel in the opposite direction the position of the planes is reversed, causing an upward movement of the machine. Lateral movement may be imparted to either the right or left at the will of the operator, by means of the side planes 69 and vertical rudders 86.

As each set of side planes is controlled by the independently operable shafts 73, which also control the rudders, it will readily be seen that one set of planes and one rudder only are operable together. When lateral movement is desired, for instance to the right, the operator will shift the right hand lever 73ª forward, rotating the right hand shaft 73 which will rock the right hand set of planes 69 and bring the underside of said planes against the wind and simultaneously turn the right hand rudder into the proper position.

If desired, a slight motion may be imparted to the wings by means of a lever 39ª, Fig. 7, fixed on the shaft 39.

I claim—

1. In a flying machine, the combination with a frame, of an even number of separate oscillative lifting propeller wing frames greater than two radiating from a common center, and means to move the alternate wing in the same direction.

2. In a flying machine, the combination with a main frame, of an even number of separate lifting propeller wing frames greater than two pivoted on fixed axes and assembled about and diverging from a common center, and power mechanism to move each alternate wing simultaneously in the same direction.

3. In a flying machine, the combination with a main frame, of an even number of separate oscillative lifting propeller wing frames each composed of side bars diverging from the center of the main frame, valves pivoted on said bars, and means to move the alternate wing frames in the same direction.

4. In a flying machine, the combination with a main frame, of an even number of separate oscillative lifting propeller wing frames each composed of side bars diverging from the center of the main frame, a single valve pivoted on each side bar, two valves pivoted on the wing frames between the side bars, and means to move each alternate wing frames in the same direction.

5. In a flying machine, the combination with a main frame, of an even number of separate wing frames pivoted on the main frame and radiating from the center of said main frame, two oppositely reciprocating members, and flexible members connected with the wing frames and reciprocating members to move the alternate wing frames in the same direction.

6. In a flying machine, the combination with a main frame, of an even number of separate wing frames pivoted on the main frame and radiating from the center of said main frame, gravity-controlled valves pivoted on the wing frames, two oppositely reciprocating members, and flexible members connected with said wing frames and reciprocating members to move the alternate wing frames in the same direction.

7. In a flying machine, the combination with a main frame having a central vertical part, of an even number of separate wing frames greater than two pivotally connected with the main frame and composed of side bars diverging outwardly, gravity-controlled valves pivoted on said side bars, flexible members connected with the wing frames and slides mounted on the central post connected with the flexible members.

8. In a flying machine, the combination with a main frame having a central vertical part, of an even number of separate wing frames greater than two pivotally connected with the main frame and composed of side bars diverging outwardly, gravity-controlled valves pivoted on said side bars, flexible members connected with the wing frames, slides mounted on the central post connected with the flexible members and means to simultaneously reciprocate the slides.

9. In a flying machine, the combination with a main frame having a central vertical part, of an even number of separate wing frames greater than two pivotally connected with the main frame and composed of side bars diverging outwardly, gravity-controlled valves pivoted on said side bars, flexible members connected with the wing frames, slides mounted on the central post connected with the flexible members and means to simultaneously reciprocate the slides in opposite directions.

10. In a flying machine, the combination with the frame and a central post; of a plurality of wings pivoted on the frame around the post, pulleys fixed to the wings, sliding members on the post, flexible members connecting the pulleys and sliding members, and means to reciprocate the latter.

11. In a flying machine, the combination with a main frame having a central post, of an even number of separate wing frames greater than two surrounding the post, pulleys on the inner ends of said wing frames journaled in the main frame, slides on the post, flexible members connected to the pulleys and slides, the consecutive flexible members passing over opposite sides of the pulleys to which they are connected, and means to reciprocate the slides in opposite directions.

12. In a flying machine, the combination with a main frame having a central post, of an even number of separate wing frames greater than two surrounding the post, pulleys on the inner ends of said wing frames journaled in the main frame, slides on the post, flexible members connected to the pulleys and slides, the consecutive flexible members passing over opposite sides of the pulleys to which they are connected, a crank shaft, and flexible members connecting the slides and shaft to reciprocate the slides in opposite directions.

13. In a flying machine, a plurality of oscillatory wings, reciprocating wing-operating members, flexible members connecting the wings and reciprocating members, and coiled springs connected at both ends to the flexible members, said springs being normally under tension.

14. In a flying machine, the combination with the frame and power mechanism; of a plurality of wings alternately operable by said mechanism, a plurality of superposed planes pivotally mounted on one edge in front and rear of said frame, and a set of superposed, centrally pivoted planes mounted on each side of the frame.

15. In a flying machine, the combination with the frame and power mechanism; of a plurality of wings alternately operable by said mechanism, a plurality of superposed planes pivotally mounted on one edge in front and rear of said frame, means to simultaneously swing said planes, a set of superposed centrally pivoted planes mounted on each side of the frame and means to independently swing each set of planes.

16. In a flying machine, the combination with the frame and power mechanism; of a number of pivoted wing-frames greater than two radiating from a common center and operated by said mechanism, a plurality of pivoted planes mounted outside of the wing frames, and a plurality of propellers interposed between the ends of the planes.

17. In a flying machine, the combination with the frame and power mechanism; of a number of pivoted wing frames greater than two radiating from a common center and oscillated about fixed axes by said mechanism, a plurality of planes pivoted on horizontal axes outside the wing frames and means to rock said planes on their pivots.

18. In a flying machine, the combination with the frame and power mechanism; of a number of pivoted wing frames greater than two radiating from a common center and oscillated about fixed pivots by said mechanism, planes pivotally mounted on horizontal axes in the front and rear of the frame, and means to simultaneously swing said planes on their pivots.

19. In a flying machine, the combination with a main frame; of a support therefor comprising a plurality of hollow communicating cylinders, rods slidable in the latter, means to supply air to the cylinders, and means to hold the rods in the cylinders and to suddenly release said rods therefrom.

20. In a flying machine, a frame supporting platform, a plurality of cylinders depending from the latter, a floor supported by the cylinders, communicating conduits communicating with the cylinders, pistons mounted in the latter, rods on said pistons projecting from the cylinders, a bumper frame connecting the pistons, a trigger-operated mechanism to connect the floor and bumper frame, and means to compress air in the cylinders, for the purpose specified.

21. In a flying machine, a frame comprising a central column, a plurality of horizontal bars radiating from the top and bottom thereof, vertical posts and horizontal rods connecting the bars, wings mounted between the top bars, power mechanism mounted below the frame for alternately operating the wings, planes pivotally mounted on the horizontal rods, means for swinging said planes, rudders mounted on the vertical posts at the rear of the frame, and means for operating the rudders.

22. In a flying machine, a main frame, alternately operable wing frames pivotally connected with the frame, a plurality of superposed centrally pivoted planes on the frame beyond the outer edges of the wing frame, means to connect the planes in sets, and an independently operable controlling shaft connected with each set of planes.

23. In a flying machine, a main frame, alternately operable wings pivotally connected with the frame, a plurality of superposed centrally pivoted planes mounted on each side of the frame, means to connect the planes in sets, an independently operable controlling shaft connected with each set of planes, a plurality of superposed planes pivoted on the frame at the front and rear thereof, and means to operate the front and rear planes simultaneously.

In testimony that I claim the foregoing as my invention, I have signed my name in presence of two subscribing witnesses.

ATTILIO PUSTERLA.

Witnesses:
PLACIDO MORI,
PAOLO TERTI.